United States Patent
Bai et al.

(10) Patent No.: US 9,554,249 B2
(45) Date of Patent: Jan. 24, 2017

(54) SYSTEMS AND METHODS FOR ENHANCING PRIVACY IN CONNECTION WITH LOCATION-BASED SERVICES

(71) Applicant: GM GLOBAL TECHNOLOGY OPERATIONS LLC, Detroit, MI (US)

(72) Inventors: Fan Bai, Ann Arbor, MI (US); Donald K. Grimm, Utica, MI (US); Leonard C. Nieman, Warren, MI (US); Robert A. Hrabak, West Bloomfield, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 14/695,137

(22) Filed: Apr. 24, 2015

(65) Prior Publication Data

US 2016/0316332 A1  Oct. 27, 2016

(51) Int. Cl.
*H04W 4/02* (2009.01)
*H04W 4/04* (2009.01)
*H04W 12/02* (2009.01)

(52) U.S. Cl.
CPC ............ *H04W 4/023* (2013.01); *H04W 4/046* (2013.01); *H04W 12/02* (2013.01)

(58) Field of Classification Search
CPC ....... H04W 4/023; H04W 4/046; H04W 12/02
See application file for complete search history.

(56) References Cited

U.S. PATENT DOCUMENTS

| | | | | |
|---|---|---|---|---|
| 8,694,646 | B1* | 4/2014 | Kothari | H04L 63/0435 709/227 |
| 2001/0055975 | A1* | 12/2001 | McDonnell | G01S 5/0018 455/456.6 |
| 2003/0187803 | A1* | 10/2003 | Pitt | G06Q 20/382 705/64 |
| 2012/0222083 | A1* | 8/2012 | Vaha-Sipila | H04L 63/102 726/1 |
| 2013/0311764 | A1* | 11/2013 | Alpert | H04L 9/0816 713/150 |
| 2014/0337998 | A1* | 11/2014 | Johansson | H04L 63/0421 726/27 |

\* cited by examiner

*Primary Examiner* — Kashif Siddiqui
(74) *Attorney, Agent, or Firm* — Mickki D. Murray, Esq.; Parks IP Law LLC (57) ABSTRACT

A system comprising a processor and comprising computer-executable instructions that cause a processor to perform operations comprising determining that user-system location data is needed by an application running at a user device. Operations of the system further include determining a first user-system location and determining a privacy parameter based on a location-accuracy requirement associated with the application. The operations further include generating, based on the privacy parameter and the first user-system location, privacy-adjusted location data indicating a second user-system location being less accurate than the first user-system location by an amount corresponding to a value of the privacy parameter. The operations also include providing the privacy-adjusted location data to a destination for use in providing a location-dependent service by way of the application at the user device.

20 Claims, 3 Drawing Sheets

Fig_1

Fig_2

SYSTEMS AND METHODS FOR ENHANCING PRIVACY IN CONNECTION WITH LOCATION-BASED SERVICES

TECHNICAL FIELD

The present disclosure relates generally to location-based services and, more particularly, to systems and methods providing location data generalized or obfuscated according to one or more contextual factors, for enhancing user privacy in obtaining the location-based services.

BACKGROUND

Many modern applications require location data for the computing device on which the applications are running for providing location-based services. Navigation, weather, social-media, entertainment, and gaming applications are common examples.

Traditional devices generally provide highly accurate location data to applications requesting user-device location. In response to a request for location from a third-party application server, for example, most devices provide definite geographic coordinates, such as by way of a satellite navigation system.

Relatively high accuracy location data is provided even when less-accurate locating techniques are used, such as triangulation or multilateration using local transmitters or transceivers such as cellular-communication towers. Another locating technique is beacon-based locating, using coordinates of a nearby wireless hotspot communicating with the user device.

In addition to knowing the exact location of the user device at the time, third parties receiving location data can track the device over time to determine particular places that the user frequents. The data can likewise be used undesirably to identify user routes or routines. While most third parties, such as application service providers, do not track users for these purposes, some do, and the potential is always present using traditional systems.

SUMMARY

There is a need for systems and methods that can generalize user-system location data based on one or more contextual factors for enhancing user privacy in connection with obtaining location-based services. Example contextual factors include an application identifier associated with the application running on a subject device, and an application category corresponding to the application.

Another example contextual factor is a population density of mobile devices in a vicinity of the subject device.

In various aspects, the present disclosure relates to a system, such as an onboard computer, or operating system, of automobile or other vehicle. In another aspect, the system includes components of a mobile communications device such as a tablet or smart phone.

In various embodiments, the operation of determining the first user-system location comprises performing a spatio-temporal logistic regression in connection with some or all geographic locations visited with the subject mobile device to determine a most-probable user-system location.

The subject device is in some cases implemented as part of a vehicle such as an automobile, the first user-system location determined being a location of the vehicle.

In one implementation, the system includes or is part of a first server remote to the user device. The first server may be referred to as a remote privacy server. The system includes a processor and a computer-readable storage device comprising computer-executable instructions that, when executed by the processor, cause the processor to perform various operations.

The instructions can be contained in modules or otherwise compartmentalized. A generating step may be performed by the processor executing a generating, or generation, module of the instructions, for instance. The module format can apply to all functions described herein—e.g., determining operations, providing operations, etc.

Other aspects and features of the present invention will be in part apparent and in part pointed out hereinafter.

The figures are not necessarily to scale and some features may be exaggerated or minimized, such as to show details of particular components. In some instances, well-known components, systems, materials or methods have not been described in detail in order to avoid obscuring the present disclosure.

Specific structural and functional details disclosed herein are not to be interpreted as limiting, but merely as a basis for the claims and as a representative basis for teaching one skilled in the art to variously employ the present disclosure.

DETAILED DESCRIPTION

As required, detailed embodiments of the present disclosure are disclosed herein. The disclosed embodiments are merely examples that may be embodied in various and alternative forms, and combinations thereof. As used herein, for example, 'exemplary,' and similar terms, refer expansively to embodiments that serve as an illustration, specimen, model, or pattern.

Specific structural and functional details disclosed herein should therefore not be interpreted as limiting, but merely as a basis for the claims and as a representative basis for teaching one skilled in the art to employ the present disclosure.

While the present technology is described primarily herein in connection with automobiles, the technology is not limited to automobiles. The concepts can be used in a wide variety of applications, such as in connection with aircraft, marine craft, and mobile communication devices, and generally in any mobile device using a location-sensitive application.

I. Overview of the Technology

The present disclosure provides, by way of various embodiments, systems and methods for providing generalized, or approximate user-system location data for use by a location-based-service (LBS) application. The user-system location is generalized to promote user privacy while meeting a minimum location-accuracy requirement of the application. The location data is in some implementations provided to an application server requiring location data for use in providing the service by way of the LBS application. In various embodiments, the location is generalized according to any of various ways described herein.

Functions of the technology can be performed by one or more systems. The performing system or systems can include an operating system of a vehicle, such as an automobile. In one implementation, the performing system(s) includes a mobile communications device such as a tablet or smart phone. In one implementation, the system includes or is part of a server, such as a remote privacy server.

Figure 1:
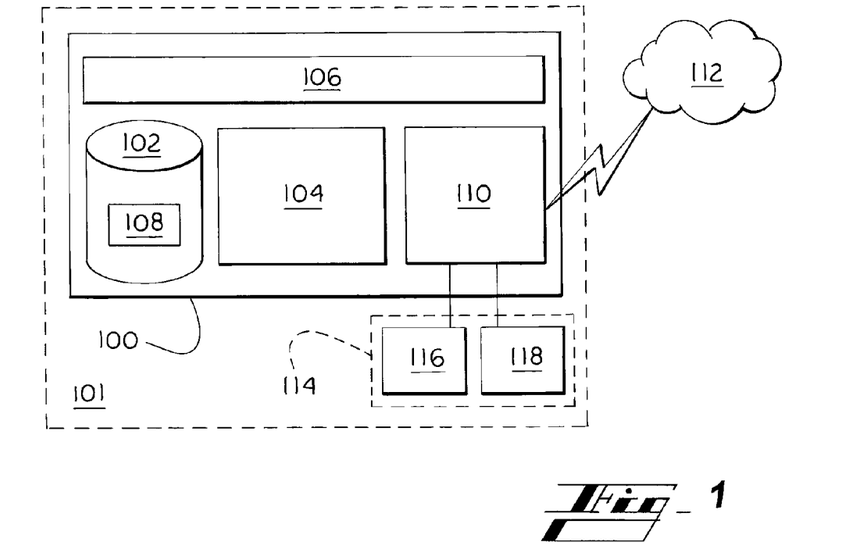
FIG. 1 illustrates schematically a computer system in which the present technology can be implemented, according to embodiments of the present disclosure.

II Computer System—FIG. 1

Turning now to the figures, and more particularly to the first figure, FIG. 1 shows an example computer, or computing system 100, for use in accordance with any of the embodiments of the present disclosure.

The computer system 100 is in various embodiments a subsystem of a greater system 101, such as an automobile. The computer system 100 can be implemented in any of a variety of ways, such as in the form of a server, or within a mobile communications device, such as a tablet or phone.

Although connections are not shown between all of the components illustrated in FIG. 1, the components can interact with each other to carry out system functions.

As shown, the computer system 100 includes a memory, or computer-readable medium 102, such as volatile medium, non-volatile medium, removable medium, and non-removable medium. The term computer-readable media and variants thereof, as used in the specification and claims, refer to tangible or non-transitory, computer-readable storage devices.

In various embodiments, storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The computer system 100 also includes a computer processor 104 connected or connectable to the computer-readable medium 102 by way of a communication link 106, such as a bus.

The processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. References herein to processor executing code or instructions to perform operations, acts, tasks, functions, steps, or the like, could include the processor performing the operations directly and/or facilitating, directing, or cooperating with another device or component to perform the operations.

The computer-readable medium 102 includes computer-executable instructions, or code 108. The computer-executable instructions 108 are executable by the processor 104 to cause the processor, and thereby the computer system 100, to perform any combination of the functions described in the present disclosure.

The computer system 100 further comprises an input/output (I/O) device 110, such as a wireless transceiver and/or a wired communication port. The processor 104, executing the instructions 108, sends and receives information, such as in the form of messages or packetized data, to and from one or more communication networks 112, such as the Internet.

In various embodiments, such as when the system 100 is implemented within a vehicle 101, the system 100 includes or is connected to one or more peripheral devices 114, such as one or more local input devices 116 and/or one or more output devices 118. The inputs 116 can include vehicle sensors such as positioning system components (e.g., GPS receiver), speed sensors, and camera systems. The outputs 118 can include any automated control system of the vehicle, such as an autonomous or semi-autonomous driving system, or a heating, ventilating, and air-conditioning system. The inputs and/or the outputs 116, 118 can include or be connected to applications such as navigation, social-media, entertainment, and weather applications installed at the vehicle 101.

The functions of the computer system(s) are further described below.

III. Environment and Operations—FIGS. 2-4

Figure 2:
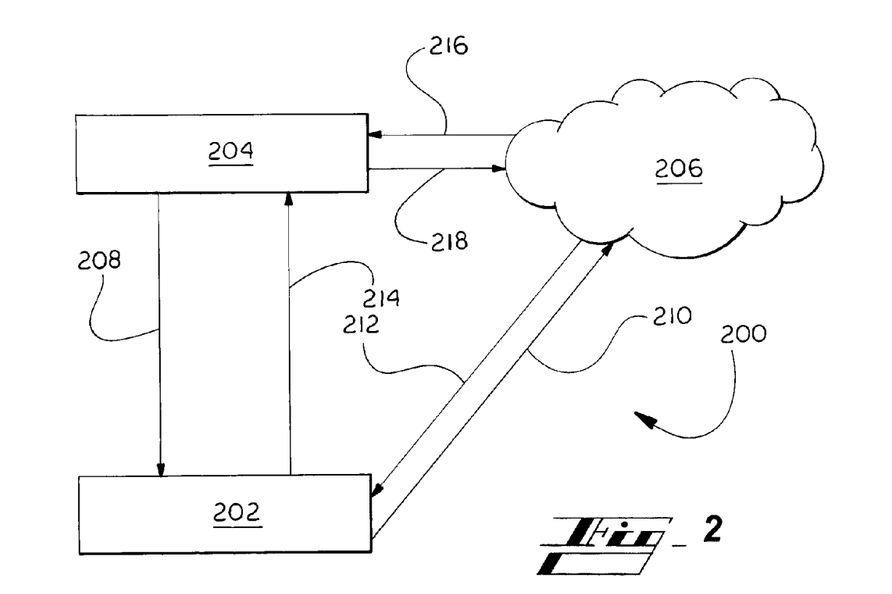
FIG. 2 illustrates an example environment in which the technology of the present disclosure can be implemented.

FIG. 2 illustrates an environment or ecosystem 200 in which the technology of the present disclosure can be implemented.

Figure 3:
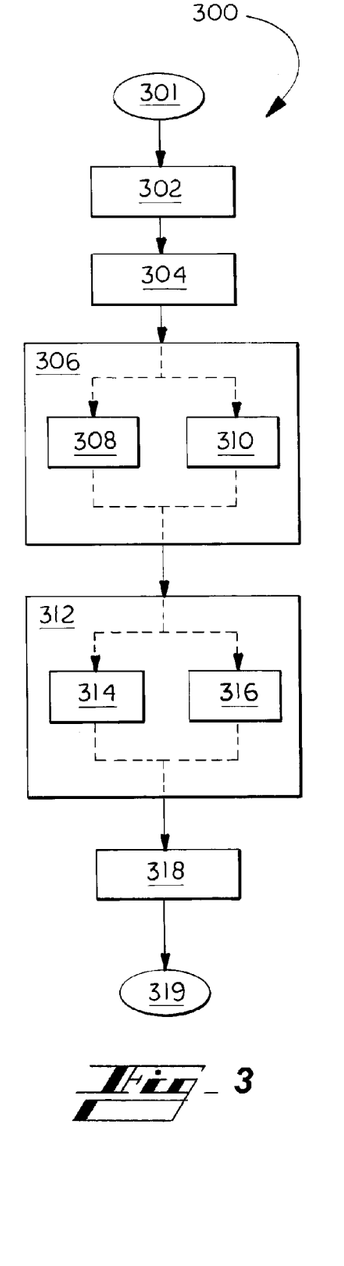
FIG. 3 illustrates a first example method according to the present disclosure.
Figure 4:
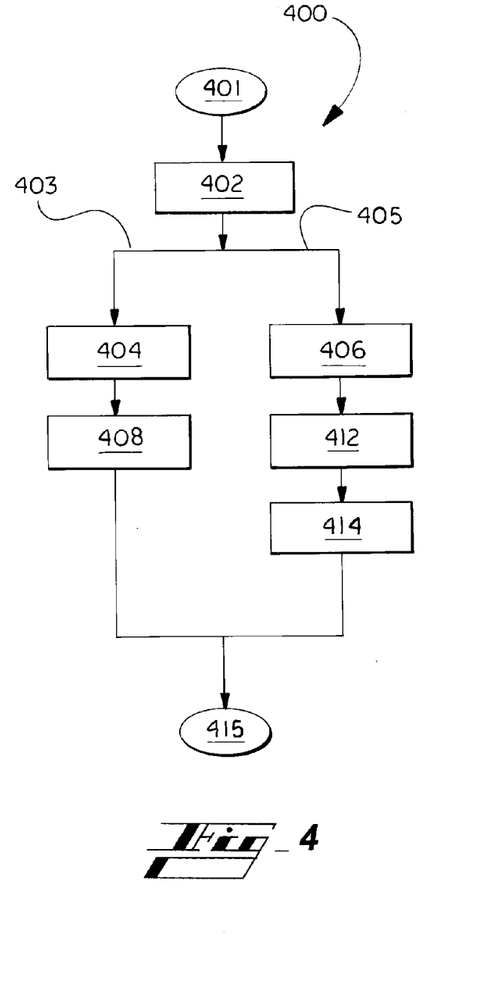
FIG. 4 illustrates a second example method according to the present disclosure.

FIGS. 3 and 4 show by flow charts algorithms performed by one or both of a user system, or user device, 202 and a third-party application server 204.

III.A. Primary Systems—FIG. 2

The user system 202 is in some embodiments an on-board computing system of a vehicle such as an automobile, or an operating system (OS) thereof.

In various embodiments, the user system 202 is a mobile communication device such as a tablet or smart phone. Modern on-board computing systems are also mobile communication devices. While the user system 202 can be referred to by other terms, such as user device, it is referenced primarily herein by the term, user system.

The user system 202, or parts thereof, can be structured as the computer system 100 of FIG. 1. For example, the system 202 can include a processor like the processor 104, and a computer-readable storage device, e.g., memory, like the computer-readable storage device 102 of FIG. 1.

The instructions 108 can include code configured to cause the processor 104 to perform any of the operations described herein.

The user system 202 has stored at its memory at least one location-based services (LBS) application. LBS applications include navigation, weather, social-media, entertainment and gaming applications, for example. They can include any computer program, or group of programs working together, using user-system location in providing a service to the user of the user device and/or the user device.

In various embodiments, the user system 202 can perform any of the functions described herein primarily in connection with one of the other systems 204, 206.

The user system 202 in various embodiments performs functions such as generalizing its own location data. In some embodiments, some of the functions are performed by a remote system 206, such as a server, which would be remote to the user device. The remote system can be referred to as a privacy server, a remote privacy server, or the like.

While the remote computing system 206 can be referred to as a privacy server, the system 206 is not limited to performing functions directed toward enhancing privacy according to the privacy-enhancing functions of the present technology or otherwise. The privacy server 206 can be referred to as a privacy server while still serving other purposes, including other server functions.

The user system 202 communicates with a third-party application server 204 in various embodiments. The third-party application server 204 provides a service by way of the application running at the user device. The server 204 is referred to primarily herein as a third-party server because it will in most embodiments be proprietary to or at least operated by an entity distinct from a provider or servicer of the user system 202 and distinct from an owner and/or operator of the privacy server 206.

The application server 204 can be structured as the computer system 100 of FIG. 1. For example, the application server 204 can include a processor like the processor 104 described, above, and a computer-readable storage device, e.g., memory, like the computer-readable storage device 102 of FIG. 1. The instructions 108 of the application server 204 comprise code configured to cause the processor 104 of the application server 204 to perform any of the operations described herein.

The application server 204 has stored at its memory at least one program configured to cause the server 204 to receive and use the privacy-adjusted location data in providing location based service to the user system 202. While in most cases the privacy-adjusted location data is received at the application server 204 from the user system 202, in one embodiment, the generalized data is received at the application server 204 from the privacy server 206.

The user system 202 is in various embodiments in communication with the privacy server 206.

The privacy server 206 can be structured as the computer system 100 of FIG. 1. As with the other components of the ecosystem 200, the privacy server 206 can include a processor like the processor 104 described, above, and a computer-readable storage device, e.g., memory, like the computer-readable storage device 102 of FIG. 1.

The instructions 108 of the privacy server 206 comprises code configured to cause the processor 104 of the privacy server 206 to perform any of the operations described herein, including those described herein primarily in connection with the privacy server 206.

The privacy server 206 may be a computer of a customer-service center or system such as the OnStar® system (ONSTAR is a registered trademark of Onstar LLC of Detroit, Mich.). For embodiments using the privacy server 206, the system 206 performs functions including receiving location data from the user devices 202, generalizing the locations received, returning the generalized locations to the respective user devices 202.

The privacy server 206 is referred to as a server considering its role providing such services for the user devices 202—e.g., for the applications at the devices 202. The location data provided by the remote server 206 can be referred to by other terms, such as privacy-adjusted location data, generalized location data, blurred location data, approximate location data, fuzzy location data, obfuscated location data, or obscured location data, each indicating a location of the user device altered to promote user privacy.

Operations are often described herein by the terms generalizing and obfuscating, yielding generalized and obfuscated location data, respectively. While, generally, (a) generalizing is used to represent a broadening of location, such as by providing a location by an area bounded by a one-mile diameter when a location within a fifty-meter-radius is requested by the application or application server 204, and (b) obfuscating is used to represent a calculated changing of the location, such as by providing an address of a venue (e.g., department store) being a mile away from an actual venue (e.g., coffee shop) at which the user system 202 is positioned. Nonetheless, descriptions herein using any of the optional terms for altering the location data (generalize, obscure, obfuscate, fuzz, blur, etc.) should be considered for various embodiments to include reference to any of the others. When an operation is described to include generalizing and/or obfuscating a first, accurate, user-system location, or to render a generalized and/or obfuscated second, less-accurate user-system location, for instance, the description should be interpreted for various embodiments to not be limited to either generalizing or obfuscating, as the terms are described (a, b) above in this paragraph. A reference to generalizing can be replaced by obfuscating or obscuring for various embodiments, for example.

In various embodiments, the privacy server 206 can perform any of the functions described herein primarily in connection with one of the other systems 202, 204. For example, while in most implementations, the privacy-adjusted user-system location is sent from the privacy server 206 to the user system 202, and from the user system 202 on to the application server 204, in one embodiment the location data generalized by the privacy server 206 is sent by the privacy server 206 directly to the application server 204—e.g., transmitted from the privacy server 206 to the application server 204 without passing through the user system 202.

The algorithms by which the present technology is implemented are now described in more detail. The algorithms are outlined by flow charts as methods 300, 400 in FIGS. 3 and 4.

It should be understood that the operations of the methods 300, 400 are not necessarily presented in any particular order and that performance of some or all the operations in an alternative order is possible and is contemplated.

The operations have been presented in the demonstrated order for ease of description and illustration. Operations can be added, omitted and/or performed simultaneously without departing from the scope of the appended claims.

It should also be understood that the illustrated methods 300, 400 can be ended at any time. In certain embodiments, some or all operations of this process, and/or substantially equivalent operations are performed by execution of computer-readable instructions stored or included on a computer readable medium, such as the memory 102.

III.B. First Process—User Device/Privacy Server—FIG. 3

The method 300 of FIG. 3 is described primarily from the perspective of the user system 202. The user system 202 can be an on-board computing system of a vehicle such as an automobile, or an operating system (OS), thereof, as mentioned. And in various embodiments, the user system 202 is a mobile communication device such as a tablet or a smart phone. And an on-board computing system can be a mobile communication device.

The operations of the method 300 are performed by at least one processor executing computer-executable code, such as a processor of the user system 202 executing code stored at a memory of the user system 202. In some embodiments any one or more functions are performed by one system (e.g., the user system 202) while one or more other functions are performed at another system (e.g., the privacy server 206). Some, but not every one, of the implementations in which functions are performed by various systems are described expressly.

The method 300 begins 301 and flow proceeds to operation 302, whereat the user system 202 (e.g., a processor thereof, executing the code stored at the user system 202) determines that location data indicating a location of the user system 202 is needed for an LBS application. In various embodiments, the determination includes determining that a geometric or global-positioning location is needed, such as global coordinates (lat/long), or that a place or place context is needed, such as a postal or street address, city, country, state, country, or the like.

The determination of block 302 in one embodiment includes receiving a request for location data from the third-party application server 204, such as for global coordinates or a street address. Transmission of the request, or the request itself, is indicated by reference numeral 208 in FIG. 2.

In a contemplated embodiment, the request is sent directly to the privacy server 206. The transmission is called out in FIG. 2 by reference numeral 218, and the request itself can be considered called out by the same reference numeral.

The user system 202 receiving the request 208 from the third-party application server 204 is one of multiple ways that the user system 202 can determine that location data is needed by the application server 204 or by the application running at the user system 202. In one embodiment, the application running at the user system 202 initiates a request for user-system location. The request can be received and processed at the user system 202 or the privacy server 206.

In response to determining at operation 302 that user-system location is needed, flow of the algorithm proceeds to operation 304 whereat a first user-system location is determined. The first user-system location can be determined in any of a variety of ways.

The first user-system location indicates a location of the user system 202 with a relatively high level of accuracy. The high-accuracy location can be determined in the normal course of user-system locating functions. High accuracy may be needed for other purposes, such as locating the device in exigent circumstances, such as in connection with a 911 call.

While high accuracy is not needed by most applications, traditional devices nonetheless provide location data at the higher, and in some cases much higher, level of accuracy than needed. User privacy can be enhanced by providing less accurate location information than the location information initially determined, and preferably by broadening the location as much as possible within limits of what the application or application server 204 will accept.

The degree to which the location is generalized—e.g., made less accurate—is based on one or more contextual factors, such as an identification of the application needing the user-system location. The techniques of the present disclosure can be referred to as providing an elastic-privacy service because the accuracy of location data to be provided to the application or application server is determined dynamically in a flexible manner in light of contextual input.

In various embodiments, first user-system location is calculated according to a spatio-temporal logistic regression configured to determine a most-probable, or most-likely, present location of the user system 202. The regression can be represented as a function including variables related to past, or historic movement and/or positioning of the user system 202. At least one of the variables can be determined by the privacy server 206, using information such as historic user-device position, or time and position, data from sources such as the user system 202. In a contemplated embodiment, at least one of the variables is determined by another system using such information, such as by the user system 202 using information generated by the system 202.

The variables include quantifiable metrics related to user-system movement and/or positioning with respect to past user-system visits to geographic locations. An example geographic location is a coffee shop visited by the user with the user system 202 (e.g., a vehicle driver). Another example is a theater that the user of the user system 202 visits with the system 202.

The determining operations include determining geographic locations at which the user device has been, and determining, in connection with some or all of the geographic locations, in relation to a pre-determined time period: a frequency metric (F) indicating a frequency of user visits with the user device to the geographic location; a duration metric (D) indicating an average amount of time that the user device was positioned at the geographic location during the visits; a regularity metric (R) indicating a periodicity of the visits; and a recency metric (r) indicating how recent the visits were.

The operation of determining the user comprises performing a spatio-temporal logistic regression in connection with some or all of the geographic locations to determine a most-probable user-system location, according to:

$$p_i(F_i, D_i, R_i, r_i) = \frac{1}{(1 + e^{\alpha_R R_i + \alpha_F F_i + \alpha_D D_i + \alpha_r r_i})} \quad (1)$$

The metrics are processed in the regression in connection with each of multiple past geographic locations (i). Each of the Greek-letter alpha factors $\alpha_F$, $\alpha_D$, $\alpha_R$, $\alpha_r$ is pre-determined based on one or more user preferences, and/or past, or historic, positioning of the user system 202. The alpha factors are constants for each processing of the regression (1), but can be changed over time, such as in response to changing user preferences or user system 202 movement over time differing from past user system 202 movement.

In various embodiments, each of the metrics is determined in connection with a time period, or time window. The time period for which each metric is determined can be the same, or one or more of the time periods can be determined using a different time period. As an example of the latter case, while the frequency metric (F) may be determined with respect to a particular location that the user system 202 visits over a 6-month window, such as an immediately preceding 6-month window, the regularity metric (R) may be determined with respect to the same particular location with respect to a 12-month window.

As provided, the frequency metric (F) indicates a frequency of user visits with the user system 202 to the geographic location. As an example, with respect to a coffee shop visited at least once by a user with the user system 202, the frequency metric (F) can indicate a number of visits to the coffee shop over the past six months. If the user visited six times, then the frequency metric (F) would represent a frequency of six visits per six months in any of a variety of ways, such as by representing an average frequency of 1 visit per month.

As provided, the duration metric (D) indicates the average amount of time that the user device was positioned at the geographic location during the visits. Continuing with the previous example, with the user visiting the coffee shop six times with respect to the subject time window of six months with the user system 202, assume the duration of visits were as follows: 1 hour on the first visit, 2 hours on the second visit, 1 hour on the third visit, 30 minutes on the fourth visit, 24 minutes on the fifth visit, and 1 hour on the sixth visit. The duration metric (D) can represent the duration of the user visits to the coffee shop with the user system 202 in any of a variety of ways, such as by representing an average duration of 59 minutes per visit.

As provided, the regularity metric (R) indicates a periodicity of the visits. Continuing with the previous example, with the user visiting the coffee shop six times with respect to the subject time window of six months with the user system 202, assume that the six visits included one visit per month. The regularity metric (R) represents quantifiably that the visits over the last six months were regular, as they were periodic on a monthly basis. As an example of quantifying the regularity metric (R), the metric (R) can be determined, and the regression (1) configured, in a manner by which more regular, or periodic, visits over the subject time window corresponds to a higher value. In this case, the regularity metric (R) would be lower if, say, two of the six visits was made within one of the subject six months, instead of the visits being one per month.

In another implementation, the metric (R) can be determined, and so the regression (1) configured, in a manner by which more regularity corresponds to a lower value regularity value (r). In this case, the metric (R) would be higher if one of the six visits was made within the first four months of the six month window. In this case, the regularity metric (R) would be higher if, say, two of the six visits was made within one of the subject six months, instead of the visits being one per month.

As provided, the recency metric (r) indicates how recent the visits were. The recency metric (r) represents the recency metric quantifiably. Continuing with the previous example, with the user visiting the coffee shop 6 times with respect to the subject time window of 6 months with the user system 202, assume that the six visits included two that were two months prior to a present time and four were within the last month.

The recency metric (r) represents quantifiably that the visits over the last six months were relatively recent, as they were mostly in the last month, and all in the last two months, of the six month window. As an example of quantifying the recency metric (r), the metric (r) can be determined, and the regression (1) configured, in a manner by which more recency corresponds to a higher value. In this case, the recency metric (r) would be lower if, say, one of the six visits was made within the first four months of the six month window than if the visits were made all in the last two months.

In another implementation, the metric (r) can be determined, and so the regression (1) configured, in a manner by which more recency corresponds to a lower value recency value (r). In this case, the metric (r) would be higher if one of the six visits was made within the first four months of the six month window.

In various embodiments, not every one of the listed metrics [(F), (D), (R), (r)] are used. In one implementation, for instance, the recency metric (r) is not included in the regression (1). The regression is also not limited to including the metrics shown, as one or more metrics can be added, in addition to or in place of one or more of the metrics shown.

In a contemplated embodiment, determining location of the user system 202 is performed by the privacy server 206. The privacy server 206 could determine the location by consulting another server (not shown), such as one of a cellular telecommunications service provider.

Traditional techniques for determining high-accuracy location data include determining definite geographic coordinates, such as by way of a satellite navigation system data, as mentioned. And high-accuracy location data can also be determined by less-accurate locating techniques such as triangulation or multilateration, using cellular communication towers, for instance.

As an example of the accuracy of modern locating techniques, the first user-system location can be determined within a matter of meters, e.g., 10-15 meters, of the actual location by methods such as satellite positioning.

In some implementations, the first user-location is determined to be, or associated in the acting system with, a venue. For instance, the system can determined that a user device is positioned at or adjacent a venue, such as a particular coffee shop (e.g., ABC Coffee Shop in Detroit, Mich., XYZ Stadium in Detroit, Mich., or a home of the user), and determine thereby that the user is at the coffee shop. Reliability of such determination is strengthened in embodiments in which the system considers user history, such as by data indicating that the user device is positioned at the coffee shop regularly or periodically. By just one example, such user history can be considered in operation of the first equation (1) above. The resulting first user location in some embodiments, then, can indicate the venue (e.g., ABC Coffee Shop, XYZ Stadium in Detroit, or the user's home) and/or the address of the venue.

Following the determination of user-system location at operation 304, flow proceeds in the algorithm 300 to operation 306 whereat a privacy parameter is determined. The privacy parameter can be referred to by other terms, such as privacy constraint or privacy factor.

The privacy parameter is represented at times herein by Greek letter epsilon ($\epsilon$). The privacy parameter ($\epsilon$) can be generated in any of multiple formats depending for example on any of the format of the first user-location data and the type of second, privacy-adjusted user-system location data needed by the application or the application server 204. Example formats for the privacy parameter ($\epsilon$) are discussed further below.

In some embodiments, the privacy parameter is determined by the privacy server 206, which is indicated by sub-routine 308 in FIG. 3. The function of the privacy server 206 determining the privacy parameter ($\epsilon$) is in various embodiments performed in generally the same or similar manner as will be described below, under operation 310, describing an implementation in which the user system 202 determines the privacy parameter ($\epsilon$). The privacy server 206 performing the function is also referenced at operation 404 of the algorithm of FIG. 4, which focuses on functions of the privacy server 206.

Advantages of using a relatively resource- and processing-rich remote computing system, like the remote privacy server 206, for functions such as determining the privacy parameter ($\epsilon$) and/or generalizing the first user-system location, include limiting burden on user-system resources, freeing up the user system 202 for focusing other user-system functions. The privacy server 206 can be a server of a customer-service center or system such as the OnStar® system, as mentioned.

In embodiments in which the privacy server 206 determines the privacy parameter (block 308), the privacy server 206 receives a request, such as from the user system 202 or the application server 204. The act of transmitting the request by the user system 202 is called out in FIG. 2 by reference numeral 210, and the request itself can be considered called out by the same reference numeral. The subsequent act of the privacy server 206 transmitting the privacy parameter ($\epsilon$) to the user system 202 is called out in FIG. 2 by reference numeral 212, and the privacy parameter ($\epsilon$) itself can be considered called out by the same reference numeral.

The request 210 sent to the privacy server 206 can have any of a variety of formats and constituent parts depending on the embodiment. The type of request 210 can depend on and/or control the functions to be performed by the privacy server 206.

When the user system 202 is relying on the privacy server 206 to determine the privacy parameter, the request 210 includes one or more contextual indicators. An example contextual indicator is an identifier corresponding to the subject application. Another example indicator is an identifier corresponding to a category or class to which the subject application belongs or relates.

The contextual indicator is used by the privacy server 206 in determining the privacy parameter. In one embodiment, the contextual indicator is sent by the user system 202 to the privacy server 206, and used at the privacy server 206 to determine the privacy parameter ($\epsilon$), such as by using a look-up table.

The request can also indicate the type of first user location data needed for the application running at the user system 202, such as the type requested by the application server 204. The types can include those mentioned above, for instance, such as a global positioning coordinates or a street address. In one embodiment, the type of location data needed affects the type of privacy parameter ($\epsilon$) determined.

In some embodiments, the privacy parameter ($\epsilon$) is determined by the user system 202, which is indicated by sub-routine 310 in FIG. 3. In one implementation, the user system 202 includes in its memory (e.g., in the computer-executable instructions 108 of the computer-readable medium 102) a privacy application configured to perform some or all of the user-system functions described herein.

The privacy parameter can be determined based on one or more indicators. An example indicator is a location-accuracy requirement associated with the subject application (e.g., weather, entertainment, or navigation app). Another example indicator is a population-density requirement. The location-accuracy requirement is at times represented by Greek letter mu ($\mu$), herein.

The location-accuracy requirement ($\mu$) can be obtained in any of a variety of ways. In one embodiment, a minimum location stipulation is received from the application server 204 or subject application. In some embodiments, the minimum location stipulation is used as the location-accuracy requirement ($\mu$), while in some embodiments the requirement ($\mu$) is less requiring than the stipulation—i.e., the requirement ($\mu$) is configured to cause the system generalizing the first user-system location to generate less accurate second user-system location.

The accuracy requested by the application or application or application server 204 can be pre-stored, such as at the user system 202, at the privacy server 206, or at another database (not shown).

As mentioned, in some embodiments, the software being executed to generate the privacy parameter (e.g., code of the user device 204 or privacy server 206) is configured to generate the location-accuracy requirement ($\mu$) to be less accurate than requested by the application location stipulation. The privacy parameter is in some embodiments determined for use in generalizing the first user-system location to a privacy-adjusted user-system location that is less-accurate, but still within an amount of accuracy requested by the application running at the device or the corresponding application server 204.

The system generating the privacy parameter in this case (e.g., the privacy server 206 or the user system 202) is programmed with code (of the referenced user-system privacy application at the user system 202) used by the generating system to determine an accuracy that, though even less accurate than the application or application server 204 has indicated as needed, is sufficient for purposes of the application or application server 204.

The system may have pre-stored criteria causing the processor to increase or decrease a stipulation by a certain percentage or by a certain amount for all apps, all apps of a certain type or category, or for the subject application, for example.

If the location stipulation requires accuracy within 50 meters, for instance, the code can be configured to cause the processor to select as the location-accuracy requirement ($\mu$) 60 meters, such as if the adjustment is pre-set to increase the stipulation by 10 meters or about 20%.

In some embodiments, the stipulation or the requirement ($\mu$) is received at the user system 202 from the application server 204. An example location-accuracy requirement ($\mu$) is 50 meters—i.e., the location server 206 requires, or at least requests, location data indicating a user-system location within 30 meters or better (i.e., or less) than an exact user-system location at the time. The location-accuracy requirement can be stored at the user system 202. As another example the location-accuracy requirement ($\mu$) can indicate a need for an exact street, or exact venue (e.g., ABC coffee shop, XYZ Stadium in Detroit, or the user's home).

The population-density requirement is based on a population (e.g., number) of people or mobile devices within a pre-determined proximity of the first user-system location over a pre-determined period of time. The number of people in the vicinity can be determined—i.e., estimated—based on the number of mobile devices, such as mobile phones, pieces of wearable technology, and/or vehicles in the vicinity. The period of time can be predetermined to be a present time, or a window leading up to the present time, such as over the last hour, as examples.

The population density can be determined by the user system 202 based on input from one or more sources, such as a server of a telecommunications service provider, or of a server of a customer-service center or system, such as the OnStar® system.

The population-density requirement is a quantified representation of the population density e.g., the number of unique user devices (indicating the number of corresponding users) at a venue (e.g., coffee shop, mall, theater, user home, or stadium), which can be represented by a street address or global coordinates, for example. This relationship between the population-density requirement and population of user devices can be represented by the following relationship:

$$\rho = f(\kappa) \qquad (2)$$

wherein Greek letter rho ($\rho$) is the population-density requirement at a given time or over a time slot, and Greek letter kappa ($\kappa$) is the population density at the time or over time slot, shown below as being a function of an inverse of the population density ($\kappa$).

In one embodiment, the population-density requirement bears an inverse relationship to the population density determined, such as by being inversely proportionate to the population density. The inverse relationship can be represented using the second equation (2), above, such as if the population density ($\kappa$) is configured accordingly, or otherwise by the following relationship:

$$\rho = f(1/\kappa) \qquad (3)$$

wherein the population-density requirement ($\rho$) is shown as a function of an inverse of the population density ($\kappa$).

In one embodiment, determining the population-density requirement ($\rho$) comprises consulting a file, such as a look-up table, to determine the population-density requirement ($\rho$) corresponding to the determined population density ($\kappa$). Determining the population-density requirement ($\rho$), whether by this technique, in some embodiments is based also on user preferences, or settings. A user of the user system 202 may set preferences indicating, or at least affecting, the manner by which a population density ($\kappa$) determined is translated into a population-density requirement ($\rho$). A preference can be stored at the user system 202, such as at the referenced privacy application, and/or at the privacy server 206 for embodiments using a privacy server—e.g., operation 308. A user less concerned with privacy may set a preference so that more accurate location data results from processing the density, for instance.

In one embodiment, the preference is set according to which of multiple pre-established privacy categories the user has selected. The categories can include, for instance: (1) high privacy—i.e., very restrictive, resulting in more generalized, less accuracy second user-location data (or privacy-adjusted location data) for providing to the subject application (e.g., weather or entertainment application) or application server; (2) medium privacy; and (3) low privacy.

Quantifiably, the privacy parameter ($\epsilon$) is determined as a function of the population-density requirement ($\rho$) and/or the location-accuracy requirement ($\mu$). In some embodiments, for instance, the privacy parameter ($\epsilon$) is or is a function of the population-density requirement, or the privacy parameter ($\epsilon$) is or is a function of the location-accuracy requirement ($\mu$).

In one embodiment, the privacy parameter ($\epsilon$) is determined based on whichever of the population-density requirement ($\rho$) and the location-accuracy requirement ($\mu$) is more restrictive. That is, the privacy parameter ($\epsilon$) would be determined based on whichever of the population-density requirement ($\rho$) and the location-accuracy requirement ($\mu$) would result in generating less-accurate location data for providing to a destination—e.g., the subject application (e.g., weather, entertainment, or navigation app) or supporting application server. The provision to the application server 204 is indicated, by way of example, by reference numeral 214 in FIG. 2.

As an example, if it is determined that based on the population-density requirement ($\rho$) the first, high-accuracy location of the user system 202 should be generalized to be within 1 mile of an actual present location of the user system 202, and that based on the location-accuracy requirement ($\mu$), the first, high-accuracy location of the user system 202 should be generalized to be within 2 miles of the actual present location of the user system 202, the acting system (e.g., the privacy server 206, in operation 308, or the user system 202, in operation 310) would determine the privacy parameter ($\epsilon$) based on the location-accuracy requirement ($\mu$).

After the privacy parameter ($\epsilon$) is determined at block 306, flow of the algorithm 300 proceeds to block 312 whereat the privacy parameter ($\epsilon$) is used to generalize the first, high-accuracy user-system location, yielding a second, lower-accuracy, privacy-adjusted user-system location for providing to the a destination—e.g., the subject application or application server. Provision to the application server 204 is indicated, by way of example, by reference numeral 214 in FIG. 2.

In some embodiments, the second, lower-accuracy, privacy-adjusted user-system location is determined by the privacy server 206, which is indicated by sub-routine 314 in FIG. 3. In a particular embodiment, the privacy server 206 sends the second user-system location to the user system 202, which passes the second location to the subject application or application server 204. In another embodiment, the privacy server 206 sends the second user-system location directly to the application server 204.

The function of the privacy server 206 determining the second user-system location is described further below, in connection with operation 412 of the method 400 of FIG. 4, focusing more on operations of the privacy server 206.

The function of the privacy server 206 determining the privacy parameter ($\epsilon$) is in various embodiments performed in a manner similar to the manner described below for operation 310, describing an implementation in which the user system 202 determines the privacy parameter ($\epsilon$). The privacy server 206 performing the function is also referenced at operation 404 of the algorithm of FIG. 4, which focuses on functions of the privacy server 206.

In some embodiments, second user-system location is determined by the user system 202, which is indicated by sub-routine 316 in FIG. 3. The function may be performed by the privacy application referenced above.

As provided, the subsequent act of the privacy server 206 transmitting the privacy parameter ($\epsilon$) to the user system 202 is called out in FIG. 2 by reference numeral 212, and the privacy parameter ($\epsilon$) itself can be considered called out by the same reference numeral.

As also provided, the privacy parameter ($\epsilon$) can take any of a variety of forms. In a contemplated embodiment, the privacy parameter ($\epsilon$) indicates an area, or scale of an area, that includes the location such as a zip code, a city, a county, a state, a country, or other region. The privacy parameter ($\epsilon$) and user system 202 can be configured, for instance, to generalize first user-system location represented as global coordinates or a street address to a broader zip code, city, county, etc.

In another embodiment, the privacy parameter ($\epsilon$) and user system 202 are configured to generalize or obfuscate the first user-system location by altering an actual address at which the user system 202 is positioned, or other relatively-high-accuracy location indicator of the system 202 location, yielding the second, privacy-adjusted user-system location. If the first user-system location is an accurate street address, for example, and the application or application server 204 requires a street address, the privacy parameter ($\epsilon$) and user system 202 can be configured to generalize or obfuscate the actual address to another address, at which the user system 202 is not located. The other address determined can be nearby the actual address or more distant, depending on what the privacy parameter privacy parameter ($\epsilon$).

The privacy parameter ($\epsilon$) is in some embodiments configured to cause the user system 202 to randomly select as the second user-system location an address being a certain distance from the actual address. In one implementation, the privacy parameter ($\epsilon$) is configured to cause the user system 202 to select as the second user-system location, an address of a large, or relatively dense or crowded nearby venue. If the user system 202 is positioned at a McDonald's restaurant at 123 Main Street, for instance, the user system 202 can determine (e.g., obfuscate, or obscure), using the privacy parameter ($\epsilon$), the second, privacy-adjusted user-system location to be an address of a nearby Walmart store. The second address can be obtained, for instance, by consulting a database, such as a location-based web server, for nearby venues, such as venues having a sufficient size, density, population, foot traffic, or the like. The user-system can select a nearby venue randomly, or based on factors such as whether the venue option/s is/are within a specific distance from—e.g., within a determined radius of—the actual address that the user system 202 is positioned at, or within a common region (e.g., city) as the actual address that the user system 202 is positioned at. For cases in which an initial try by the acting system (e.g., user system 202, here (block 316)) to determine a substitute venue within a predetermined area is not successful—e.g., a query to a location-based web service does not yield a usable substitute, such as a name or address of a satisfactory substitute location, the acting system can be configured to perform the try again, such as by another query to the web service, with different parameters, such as by increasing the size of a subject query area.

In one embodiment, the first, more-accurate, user-system location can be obscured by mapping the location to an address or coordinates, and mapping the same to a nearby venue indicated in a list of nearby venues, e.g., a list of business in the area. The nearby venue can be selected form the list randomly, or based on criteria such as size, population, density, foot traffic of the options, for instance. The resulting second, less-accurate, privacy adjusted user-system location can indicate the venue by name, address, and/or coordinates, by way of examples.

In one embodiment, the acting system—e.g., user system 202, here (block 316) comprises or access an exclusion list to ensure that the second, less-accurate, privacy-adjusted location determined does not indicate that the user system 202 is at an undesirable place. The exclusion list can include, e.g., cities in an adjacent state or country, such as for cases in which a user may be moving near the border and it is beneficial, for the user or otherwise, not to alter the location so as to indicate that the user device is in the other state or country. As another example, the exclusion list can include a casino or any other venue that may lead to an unwanted determination based on the location, especially considering that the user system 202 is not actually there. In some embodiments, the exclusion list can be created or altered by a user of the user system 202.

As in other implementations, such as when global coordinate are needed by the application or application server 204, in these examples, the privacy parameter ($\epsilon$) and the user system 202 are configured to generate a second user-system location that, while not accurate, is determined sufficient, or determined within bounds deemed or determined sufficient, for the intended use of the application or application server 204. If the application is a weather or local-events application, for instance, it would not matter to the application whether the user system 202 is positioned at a first address (e.g., McDonald's) or at a nearby or even most distant but still relatively proximate second address (e.g., Walmart). The process for setting the privacy parameter ($\epsilon$) can include on an application, or application-function basis the amount of accuracy actually needed. As mentioned, the amount of accuracy actually needed can be lower than that indicated by a minimum accuracy stipulation received from the application or application server 204.

In various embodiments, the privacy parameter ($\epsilon$) takes the form of a mathematical factor, such as a multiplier or divisor. If, for example, the privacy parameter ($\epsilon$) is 4, and the location-accuracy requirement ($\mu$) indicates a need for location data within 60 meters, then the privacy-adjusted first, higher-accuracy user-system location is quadrupled by the user system 202 (or the privacy server if operation 314), yielding the second, lower-accuracy, privacy-adjusted user-system location of 240 meters.

The privacy parameter ($\epsilon$) is in various embodiments a value indicating a distance by which to move the first user location. If, for example, the privacy parameter ($\epsilon$) indicates 4,000 meters, then the second, lower-accuracy, privacy-adjusted user-system location is determined to be 4,000 meters from the first, higher-accuracy user-system location.

In a particular, the direction of this 4,000-meter vector can be randomized—i.e., in any direction.

The operation of generating the privacy-adjusted location data based on the privacy parameter ($\epsilon$) can be represented generally by the following:

$$L_2 = f(\epsilon, L_1) \tag{4}$$

indicating that the second, lower-accuracy, privacy-adjusted user-system location ($L_2$) is determined as a function of the first, more-accurate, user-system location ($L_1$) and the privacy parameter ($\epsilon$).

In some embodiments, the operation of generating the privacy-adjusted location data based on the privacy parameter ($\epsilon$) can be represented by the following:

$$L_2 = (1+\epsilon)L_1 \tag{5}$$

again, where $L_1$ is the first user-system location, $L_2$ is the second user-device, and $\epsilon$ is the privacy parameter.

At operation 318, the second, lower-accuracy, privacy-adjusted user-system location is provided to a destination, such as the subject application (e.g., weather, entertainment, or navigation app) or supporting application server, in response to the determination (e.g., request for location data) of operation 302. For some of the embodiments in which a privacy server 206 is used and the data is sent to the application server 204, the privacy server 206 sends the privacy-adjusted user-system 202 location data directly to the application server 204—e.g., without the data passing through the user system 202, as mentioned. The transmission is called out in FIG. 2 by reference numeral 216, and the transferred data itself can be considered called out by the same reference numeral.

The algorithm can end 319. The application or application server 204 uses the privacy-adjusted user-system location in providing a subject service. In these ways an application or application server is provided with a less-accurate, but sufficiently accurate location of the user system 202 for supporting application or application-server functions, without giving more or at least much more accurate location data than needed, thereby enhancing user privacy.

As provided, the techniques of the present disclosure can be referred to as providing an elastic-privacy service because the accuracy of location data to be provided to the application or application server is lowered dynamically in a flexible manner considering contextual input.

III.C. Second Process—User Device—FIG. 4

FIG. 4 illustrates a second method 400 according to another embodiment of the present disclosure. The method 400 of FIG. 4 is provided primarily from the perspective of the privacy server 206.

The operations of the method 400 are performed by at least one processor executing computer-executable code of the privacy server 206. In various embodiments, any one or more of the functions are performed by another system, such as by the user system 202. Some, but not all, of the ways that the functions can be performed by separate components are described.

The method 400 begins 401 and flow proceeds to operation 402, whereat the privacy server 206 (e.g., a processor thereof, executing the code stored at the privacy server 206) receives a request. In various embodiments, the request is received from the user system 202 or an application server 204. Transmission of the request, or the request itself, is indicated by reference numeral 210 in FIG. 2.

The request 210 indicates a need for either a privacy parameter ($\epsilon$) or a privacy-adjusted location of the user system 202.

For requests 210 indicating a need for the privacy parameter ($\epsilon$), flow proceeds along path 403 to operation 404. The request 210 can in this case include, for example, one or more contextual indicators. An example contextual indicator is an identifier corresponding to the subject application. The indicator can include, for example, a name or code corresponding to the particular application. Another example indicator is an identifier corresponding to a group, category, or class to which the subject application belongs or relates. The indicator can include, for example, a name or code corresponding to a class, group, or category to which the application belongs.

For requests 210 indicating a need for privacy-adjusted location for the user system 202, flow proceeds along path 405 to operation 406. The request 210 in this case can include, for example, the one or more contextual indicators and the relatively high-accuracy user-system location data. The types (e.g., global-position coordinates) and sources of first user-system location data (e.g., satellite navigation system, or equation (1), above) have been described above.

At operation 404, the privacy server 206, having received a request 210 for the privacy parameter ($\epsilon$), proceeds to determine the same. The function of the privacy server 206 determining the privacy parameter ($\epsilon$) is in various embodiments performed in a manner similar to the manner described above for operation 310, describing an implementation in which the user system 202 determines the privacy parameter ($\epsilon$).

After determination of the privacy parameter at operation 404, flow of the algorithm 400 proceeds to operation 408, whereat the privacy server 206 sends the privacy parameter ($\epsilon$) to the user system 202. The user system 202 then uses the privacy parameter ($\epsilon$) to generalize the first user-system location, yielding the second, less-accurate, privacy-adjusted user-system location as described above in connection with operation 310 of the algorithm of FIG. 3.

At operation 406, the privacy server 206, having received a request 210 for the generalized, or privacy-adjusted location data, proceeds to determine the same. As provided, the request 210 in this implementation can include the one or more contextual indicators and the first user-system location data.

The second user-system location is determined based on the privacy parameter ($\epsilon$). For cases in which the privacy parameter ($\epsilon$) is not provided with the request 210, the privacy server 206 at operation 406 determines the privacy parameter ($\epsilon$), as at operation 404. For cases in which the privacy parameter ($\epsilon$) is provided with the request 210, flow proceeds from receiving the request 210 at block 402 to the privacy server 206 at operation 412.

At operation 412, the privacy server 206 generalizes the first user-system location data, yielding the second, privacy-adjusted user-system location data. The second location is determined using the privacy parameter ($\epsilon$) determined (block 406) or received in the request 210 (block 402).

The privacy server 206 generalizing the user-system location is in various embodiments performed in generally the same or similar manner as described above for operation 310, which describes an implementation in which the user system 202 determines the privacy parameter ($\epsilon$).

After generation of the second, privacy-adjusted user-system location data, at operation 412, flow proceeds to operation 414, whereat the privacy server 206 sends the privacy-adjusted user-system location data to a destination.

The destination in some implementations includes the user system 202, which will pass the generalized user-system location to the subject application running at the user system or to a corresponding application server. The user system 202 sends the privacy-adjusted location data in response to a determined need, as described in connection with operation 302 of FIG. 3. The privacy-adjusted location data is provided in response to a request (208 in FIG. 2) from the application server, for instance.

The destination in some implementations the application server corresponding to the application running at the user system 202. In one embodiment the location data generalized by the privacy sever 206 is sent by the privacy server 206 directly to the application server 204—e.g., transmitted from the privacy server 206 to the application server 204 without passing through the user system 202. The provision to the application server 204 is indicated, by way of example, by reference numeral 214 in FIG. 2.

The algorithm can end 415. As with the conclusion of the first method 300, at the conclusion of the second method 400, the application or application server 204 uses the privacy-adjusted user-system location in providing a subject service. In these ways an application or application is provided with a less-accurate, but sufficiently accurate, location of the user system 202 for supporting application or application-server functions, without giving more or at least much more accurate location data than needed, thereby enhancing user privacy.

As provided, the techniques of the present disclosure can be referred to as providing an elastic-privacy service because the accuracy of location data to be provided to the application or application server is lowered dynamically in a flexible manner considering contextual input.

IV. Terminology—Accurate and Precise

The present disclosure describes in various embodiments functions, such as generalizing location data, for yielding location data that is less "accurate." Terms accurate, accuracy, and the like, are not used in a limited sense herein, unless a limiting interpretation is indicated expressly. These terms can include any of various measures, or indicators, of location data quality. The terms can refer, for instance, to a closeness of the location determined is to the actual location. The term can also, or instead, refer to a certainty with which a location is determined. The first case, regarding how close a location determined is to an actual location, is what is most commonly referred to by the term 'accuracy.' The other case, regarding a certainty of a location determined, is what is sometimes referred to as preciseness, or precision.

Figure 5:
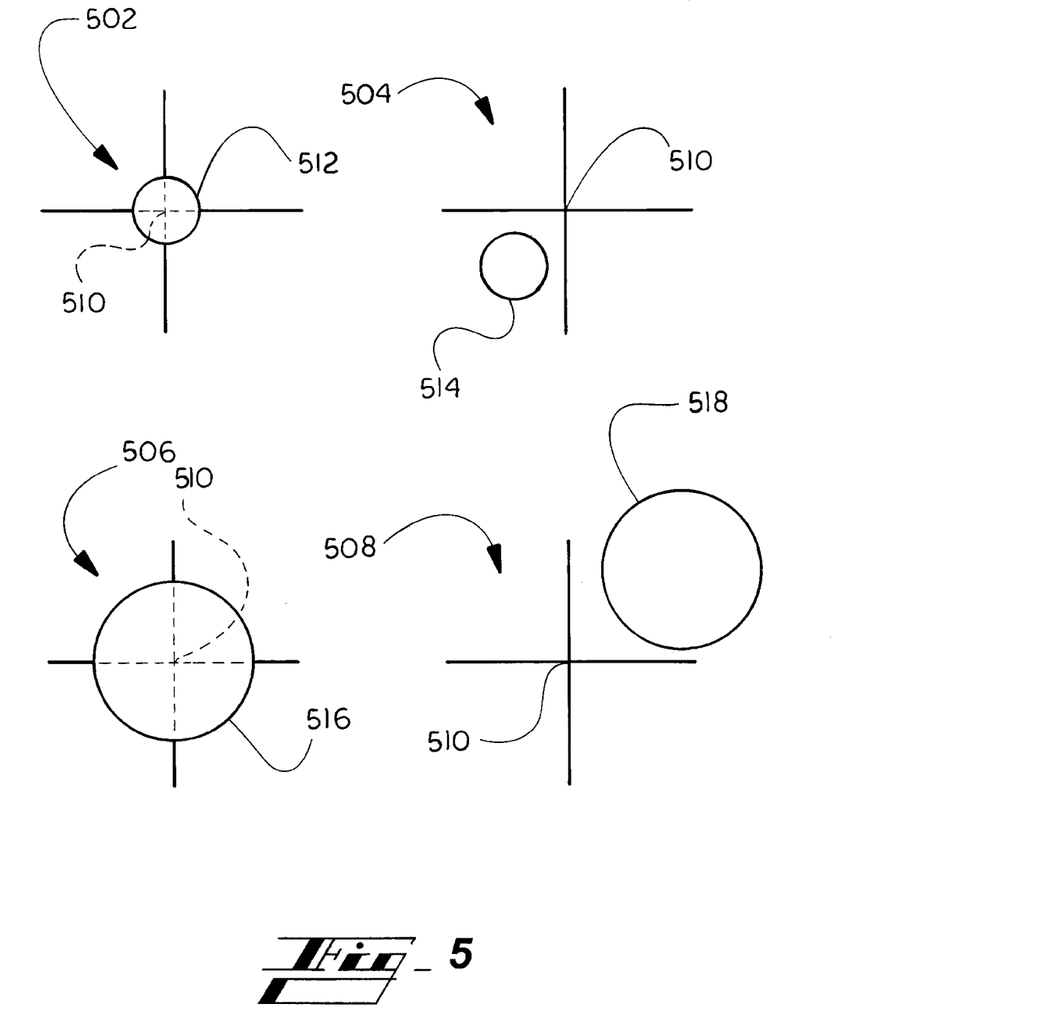
FIG. 5 shows distinctions amongst four locating scenarios to illustrate differences between terminologies related to definiteness of location data.

To illustrate a distinction between these common uses of accuracy and precision, FIG. 5 shows four scenarios 502, 504, 506, 508.

In each scenario, an actual location of a user system or device, such as a mobile phone or an operating system of a modern automobile, is indicated by reference numeral 510—i.e., at the crosshairs, where the axes intersect.

The accuracy and preciseness of location data in each scenario 502, 504, 506, 508 is indicated by a size and positioning of the respective circles 512, 514, 515, 518 illustrated.

In the first scenario 502, the location data is both precise and accurate (using here the more limited sense of the term accurate), being centered about the actual location 510 (accuracy—e.g., proximity to the actual location), and by the circle 512 being relatively small (preciseness).

In the second scenario 504, the location data has a relatively high preciseness, being represented by a circle 514 that is relatively small, but has a relatively lower accuracy (here, again, the more limited sense of the term accurate) because the circle 514 (e.g., a center of the circle) is offset from the actual location 510.

In the third scenario 506, the location data has a relatively low preciseness, being represented by a circle 516 that is relatively large, but a relatively high accuracy (limited sense) because a center of the circle 516 corresponds to the actual location 510.

In the fourth scenario 508, the location data has a relatively low preciseness, being represented by a circle 518 that is relatively large, and has a relatively low accuracy (limited sense), because the circle 518 (e.g., a center of the circle) is not positioned at or very close to the actual location 510.

As an example of using these terms herein, if a claim indicates that an application server requested location data having high accuracy and high preciseness, then the term accuracy is being used in its limited sense. If the claim only indicates that high accuracy location data was requested, the recitation should be interpreted in its broader sense, to include the application server requiring location data that is highly accurate (limited sense) and/or highly precise.

V. Select Benefits of the Present Technology

Many of the benefits and advantages of the present technology are described herein above. The present section restates some of those and references some others. The benefits are provided by way of example, and are not exhaustive of the benefits of the present technology.

Advantages of the present technology include enhancing privacy for users of user systems including by not limited to mobile systems such as vehicle operating systems and mobile phones or tablets.

Privacy is enhanced by a performing system or systems, such as a privacy server and/or the user system, determining a generalized but sufficient user-system location to provide to a requesting application server instead of providing location data that is more accurate than needed.

As disclosed, the technology in some embodiments includes using a resource-rich and processing-rich computing system remote to a subject user system, such as a privacy server. Advantages of using such a system, such as for generating a privacy parameter, and/or generalizing, or obfuscating, the user-system location using the privacy parameter, include lowering burden on user-system resources.

VI. Conclusion

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A system comprising:
a processor; and
a non-transitory computer-readable storage device comprising computer-executable instructions that, when executed by the processor, cause the processor to perform operations comprising:
determining that user-system location data is needed by an application running at a user device;
determining a first user-system location;
determining a privacy parameter based on a location-accuracy requirement associated with the application;
generating, based on the privacy parameter and the first user-system location, privacy-adjusted location data indicating a second user-system location being less accurate than the first user-system location by an amount corresponding to a value of the privacy parameter; and
providing the privacy-adjusted location data to a destination for use in providing a location-dependent service by way of the application at the user device.

2. The system of claim 1 wherein the operations further comprise determining the location-accuracy requirement, including retrieving the location-accuracy requirement using at least one datum selected from a group consisting of an application identifier associated with the application or an application category corresponding to the application.

3. The system of claim 2 wherein the operation of determining the location-accuracy requirement associated with the application is based on a minimum accuracy stipulation associated with the application.

4. The system of claim 3 wherein the location-accuracy requirement determined is less accurate than the minimum accuracy stipulation associated with the application.

5. The system of claim 4 wherein the operation of determining the location-accuracy requirement comprises an operation selected from a group consisting of:
determining an amount of accuracy by which to reduce the minimum accuracy stipulation associated with the application, yielding the location-accuracy requirement being less accurate than the minimum accuracy stipulation; and
determining a lower-accuracy requirement corresponding to the application and being less accurate than the minimum accuracy stipulation.

6. The system of claim 1 wherein the operation of determining the privacy parameter is also based on a population-density requirement associated with a vicinity in which the user device is positioned.

7. The system of claim 6 wherein the operation of determining the privacy parameter comprises selecting as the privacy parameter whichever of the population-density requirement and the location-accuracy requirement would result in the generating operation yielding less-accurate location data for providing to the destination.

8. The system of claim 6 wherein the operations further comprise:
determining a population density corresponding to the first user-system location; and
determining the population-density requirement based on the population density.

9. The system of claim 8 wherein the operation of determining the population density comprises determining a density of mobile devices being within a pre-determined proximity of the first user-system location over a pre-determined period of time.

10. The system of claim 1 wherein:
the operation of generating the privacy-adjusted location data comprises calculating the second user-system location according to $L_2=(1+\epsilon)L_1$;
$L_1$ is the first user-system location;
$L_2$ is the second user-system location; and
$\epsilon$ is the privacy parameter.

11. The system of claim 1 wherein:
the operations further comprise:
  determining geographic locations at which the user device has been;
  determining, in connection with some or all of the geographic locations, in relation to a pre-determined time period:
    a frequency metric (F) indicating a frequency of user visits with the user device to the geographic location;
    a duration metric (D) indicating an average amount of time that the user device was positioned at the geographic location during the visits;
    a regularity metric (R) indicating a periodicity of the visits; and
    a recency metric (r) indicating how recent the visits were; and
the operation of determining the first user-system location comprises performing a spatio-temporal logistic regression in connection with some or all of the geographic locations to determine a most-probable user-system location, according to:

$$p_i(F_i, D_i, R_i, r_i) = \frac{1}{(1 + e^{\alpha_R R_i + \alpha_F F_i + \alpha_D D_i + \alpha_r r_i})},$$

for each geographic location (i), where $\alpha_F$, $\alpha_D$, $\alpha_R$, $\alpha_r$ are pre-determined constants corresponding to the frequency (F), duration (D), regularity (R), and recency (r) metrics, respectively.

12. The system of claim 11 wherein each of the constants $\alpha_F$, $\alpha_D$, $\alpha_R$, $\alpha_r$ is pre-determined based on at least one variable selected from a group consisting of a user preference and past positioning of the user-device.

13. The system of claim 1 wherein the user device is part of an automobile, and the first user-system location is an automobile location.

14. The system of claim 1 wherein the destination is a third-party application server being remote to the first user-system location and serving the application for providing the location-dependent service by way of the user device.

15. The system of claim 14 wherein the operation of providing the privacy-adjusted location data to the third-party application server comprises providing the privacy-adjusted location data to the third-party application server by way of a communication configured to reach the third-party application server without passing through the user device.

16. The system of claim 1 wherein the user device comprises or is part of the system.

17. The system of claim 1 wherein the system comprises or is part of a privacy server remote to the user device being at the first user-system location.

18. The system of claim 17 wherein the operation of determining the location-accuracy requirement associated with the application comprises receiving, from the user device, a datum selected from a group consisting of the location-accuracy requirement, an application category corresponding to the application, and an application identifier associated with the application.

19. A non-transitory computer-readable-storage device comprising computer-executable instructions that, when executed by a processor, cause the processor to perform operations comprising:
  determining that user-system location data is needed by an application running at a user device;
  determining a first user-system location;
  determining a privacy parameter based on a location-accuracy requirement associated with the application;
  generating, based on the privacy parameter and the first user-system location, privacy-adjusted location data indicating a second user-system location being less accurate than the first user-system location by an amount corresponding to a value of the privacy parameter; and
  providing the privacy-adjusted location data to a destination for use in providing a location-dependent service by way of the application at the user device.

20. A process, comprising:
  determining, by an apparatus comprising a processor executing computer-executable instructions of a non-transitory computer readable storage device, that user-system location data is needed by an application running at a user device;
  determining, by the apparatus, a first user-system location;
  determining, by the apparatus, a privacy parameter based on a location-accuracy requirement associated with the application;
  generating, by the apparatus, based on the privacy parameter and the first user-system location, privacy-adjusted location data indicating a second user-system location being less accurate than the first user-system location by an amount corresponding to a value of the privacy parameter; and
  providing, by the apparatus, the privacy-adjusted location data to a destination for use in providing a location-dependent service by way of the application at the user device.

* * * * *